United States Patent Office 3,175,610
Patented Mar. 30, 1965

3,175,610
REMOVAL OF UNDESIRABLE IONS FROM
AQUEOUS FLOODING SOLUTION
Joseph S. Osoba, Houston, Tex., assignor, by mesne
assignments, to Jersey Production Research Company, Tulsa, Okla., a corporation of Delaware
No Drawing. Filed July 12, 1961, Ser. No. 123,431
6 Claims. (Cl. 166—9)

This invention relates to recovery of oil by water drive from subsurface reservoirs, especially depleted or nonproductive reservoirs.

Production of oil by any of the known reservoir-producing techniques, as for example water drive, gas cap drive, dissolved gas drive, gravity drainage, etc., leaves significant quantities of oil in the reservoir. The most efficient of these displacement mechanisms, whether it is a primary (naturally occurring) or secondary (rejuvenating) operation, is displacement of oil by water. However, even this technique leaves from one-tenth to one-third of the total reservoir pore space filled with oil.

When water attains a certain local saturation during a water drive or flooding operation, the continuous oil filaments break into disjointed segments which are entrapped and held immobile by capillary forces. Surface-active agents or surfactants have been employed to reduce the magnitude of the capillary forces in an attempt to prevent entrapment of the oil, or to free the oil after it has been trapped. In certain instances, where the oil is held at least partly by its adhesion to the rock surfaces, surface-active agents also may act as a detergent.

Surfactants may be added to the flood water or preferably, the surfactants may be produced in situ. Producing surface-active agents in situ has advantages over the simple introduction of surface-active agents to the floodwater, because when produced in situ the surface-active agents are concentrated in the interface between the oil and water where they are most needed, and because of this, they do not contact the rock surfaces with resultant adsorption by the rock surfaces. Also, variations in the interfacial tension which result from differences in concentration of the surface-active agents at different places in the interface cause localized stirring and turbulence which tend to cause the trapped oil to emulsify itself spontaneously. Further, the interfacial tension during the transient phase in which a surface-active agent is coming to equilibrium between the oil and water phases may be reduced below its equilibrium value by a factor of 100. This is believed to result from the fact that a much larger concentration of surface-active agent is maintained in the interface by in situ formation than can be obtained at equilibrium when the total concentration of surface-active agent is in the water phase.

Various ways in which the surface-active material can be formed in situ are set forth in U.S. application Serial No. 709,783, filed January 20, 1958, by W. M. McCardell entitled "Method of Oil Recovery." Essentially, these procedures involve reacting bases contained in the floodwater with organic acids contained in the oil to produce surface-active agents at the oil-water interface.

The presence of undesirable ions, e.g., bivalent cations, especially $Ca^{++}$ and $Mg^{++}$, in the flooding solution have an adverse effect upon the ability of the surface-active agents, whether formed in situ or added to the floodwater to lower the interfacial tension. Almost all water (subsurface salt water) available for secondary recovery water-flooding projects contains significant amounts of these undesirable bivalent cations, and it is desirous to remove them from the floodwater in order to overcome the adverse effect they have on lowering the interfacial tension.

A primary object of the present invention is improvement of the water-flood process through removal of undesirable ions.

Briefly, the process of the invention comprises preceding the injection of floodwater into the subsurface formation with an aqueous solution having higher concentrations of selected ions than are present in the formation water to displace the undesirable ions from the surfaces of the rocks of the formation. In this manner the formation is activated to remove the undesirable ions from the floodwater solution itself by absorbing them from the floodwater. Thus, to remove the undesired calcium ion from a flood water, the formation is first flooded with a solution that is higher in sodium chloride concentration than the water in the formation. This solution displaces calcium from the surfaces of the rock. Injection of floodwater containing a lower sodium chloride concentration than the preceding solution then follows the injection of the higher sodium chloride concentration solution, and the floodwater is stripped of its calcium by the rock surfaces.

A more detailed explanation of the invention follows.

It is known that subsurface formations are able to adsorb ions from solutions by a base exchange mechanism. Thus, if a solution containing both sodium and calcium ions is injected into the subsurface formation, the formation will adsorb some of each ion until an equilibrium exists between the concentration of each ion in the solution injected and the quantity of each ion adsorbed on the formation material. This equilibrium is controlled by mass action relationships and may be expressed as follows:

$$K = \frac{(Na^+)^2(CaFo)}{(Ca^{++})(NaFo)^2}$$

where:

K is the equilibrium constant
CaFo is the calcium formation material
NaFo is the sodium formation material From this relationship it is seen that if the sodium ion is increased, some of the excess sodium ion will be adsorbed and some of the calcium ion will be desorbed in order to maintain the equilibrium value constant. The converse also is true.

It is also seen based on this relationship that the concentration of the sodium ion in the water injected ahead of the floodwater in the first step of the method of the invention must be higher than the concentration of this ion in the formation water. Any higher amount is suitable if the formation is exposed to a sufficient volume of the injected water. Practically, it is desirable to have the water contain a sodium ion concentration substantially higher than the formation water even to the extent of being saturated in order that large volumes of water not be required in the first step of the process since this step in itself displaces no oil.

Similarly, it is seen from this relationship that when the injected floodwater which follows the formation-treating water contains less sodium ion than the treating water, then the calcium ion is adsorbed from the water and some of the sodium ion will be desorbed from the formation material. Thus, as in the case of the treating water versus formation water the concentration of the sodium ion in the floodwater only need be less than that in the previously-injected treating water being displaced, but the greater the difference in the concentrations, the more effective is the process. The lower limit of the sodium ion concentration is just enough to prevent formation damage from water that is too fresh.

The equilibriums involved in this method are attained almost instantly because of the small particle size and large surface area involved, which renders intimate contact between the water and the formation material.

The method of the invention achieves superior results over treating the injected water chemically by well-known water softening techniques to remove unwanted ions, for if the treated water contains no calcium ion and a sodium ion equal to that contained by the water in place, then the mass action relationship requires the calcium ion to be desorbed from the formation material into the water. Thus, the water will pick up calcium ion, which nullifies the treatment and the oil recovery method fails because of the presence of the unwanted calcium ion.

Having fully described the nature, objects, and method of the invention, I claim:

1. A waterflood type displacement process for increasing oil recovery from an underground reservoir in which surfactants are used to lower the interfacial tension between the reservoir oil and the oil displacing floodwater and undesirable bivalent cations are removed from the oil displacing floodwater in order to overcome the adverse effect of such cations on lowering of said interfacial tension comprising the sequential steps of injecting into said reservoir through an injection well a first water solution having a higher concentration of selected univalent cations than the resident water and said resident water also containing bivalent cations, to cause thereby said selected univalent cations to be adsorbed onto the rock surfaces of said reservoir from said first water solution and said bivalent cations to be desorbed from the rock surfaces of said reservoir into said first water solution; and then injecting into said reservoir through said injection well directly behind said first water solution a second water solution adapted to displace reservoir oil from said injection well to a producing well, said second water solution having a lower concentration of said selected univalent cations than said first water solution and also containing undesired bivalent cations, to cause thereby said undesired bivalent cations to be adsorbed from said second water solution onto the rock surfaces of said reservoir and said selected univalent cations to be desorbed from the rock surfaces of said reservoir into said second water solution in order to remove bivalent cations from said second water solution so that surfactants capable of lowering the interfacial tension between the reservoir oil and said second water solution permit said second water solution to move said reservoir oil to the producing well where it is produced.

2. A method as recited in claim 1 in which surfactants are added to said second water solution prior to its injection into the reservoir.

3. A process as described in claim 1 in which surfactants are formed in situ in the reservoir.

4. A process as described in claim 3 in which said selected univalent cations consist essentially of sodium ions.

5. A process as described in claim 4 in which said undesired bivalent cations consist essentially of calcium ions.

6. A process as described in claim 4 in which said undesired bivalent cations consist essentially of magnesium ions.

References Cited by the Examiner
UNITED STATES PATENTS

| | | | |
|---|---|---|---|
| 2,738,325 | 3/56 | Rydell | 166—9 X |
| 3,025,911 | 3/62 | Bergman | 166—42 |
| 3,033,288 | 5/62 | Holm | 166—9 |
| 3,087,539 | 4/63 | Maurer | 166—9 |

CHARLES E. O'CONNELL, *Primary Examiner.*
BENJAMIN HERSH, *Examiner.*